May 5, 1936.　　M. GARBELL　　2,039,528
SCALE
Filed Dec. 17, 1934　　2 Sheets-Sheet 1

Witness:
Martin H. Olsen.

Inventor:
Max Garbell,
By Geo. J. DuBois Atty.

May 5, 1936.  M. GARBELL  2,039,528
SCALE
Filed Dec. 17, 1934  2 Sheets-Sheet 2
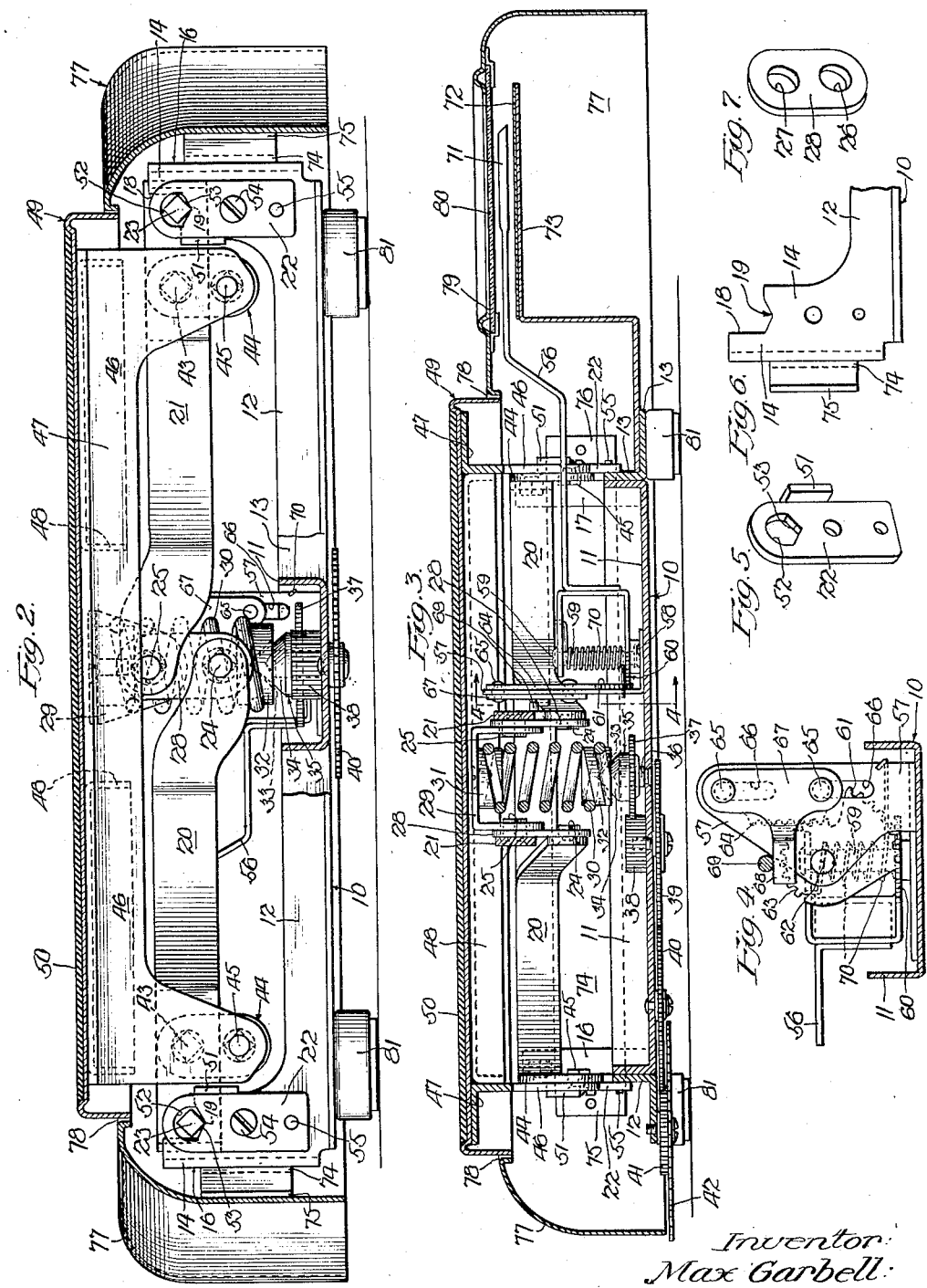
Witness
Martin H. Olsen
Inventor
Max Garbell
By Leo J. Dumais Atty Patented May 5, 1936

2,039,528

UNITED STATES PATENT OFFICE 2,039,528

SCALE

Max Garbell, Chicago, Ill., assignor to Victor Adding Machine Company, Chicago, Ill., a corporation of Delaware Application December 17, 1934, Serial No. 757,811

9 Claims. (Cl. 265—68)

This invention relates to scales for weighing individuals and more particularly to the so-called bathroom type of scale which are relatively small and compact and which require little room for their use.

The chief objects of the invention are the provision of an extremely shallow type of scale wherein the weighing and registering mechanism is strongly constructed and compact, being so arranged as to provide the maximum accuracy during its weighing operations.

Another object is the provision of a single spring with an adjustment device for bodily regulating the position of the same without effecting the tensioning thereof to adjust the normal position of a swinging indicator on the registering dial of the scale.

Still another object is the provision of members forming equalizer means that are linked together in a novel manner and which carry the platform of the scale so that as a weight is placed on any part thereof, the load will be distributed equally to these members and cause a vertical movement of the platform.

Another object is the provision of a scale having a platform so arranged and constructed that the possibility of tipping or tilting is eliminated and wherein the registering mechanism is mounted a substantial distance below the plane of the platform and coacts with the equalizer means in a novel manner so as to effect a positive movement of the indicator over the dial and accurately record the weight placed on the platform.

Other objects and advantages of the invention will become apparent from the ensuing description and claims.

Referring to the drawings:—

Figure 2 is a detail cross-sectional view taken substantially on the line 2—2 of Fig. 1.

Figure 3 is a longitudinal sectional view taken substantially on the line 3—3 of Fig. 1.

Figure 4 is a detail cross-sectional view taken on the line 4—4 of Figs. 1 and 3.

Figure 5 is a detail perspective view of my improved guide and retaining means for the pivotal members supporting the platform.

Figure 6 is a detail front view showing the frictionless mounting used in connection with the guide and retaining means, and Figure 7 is a detail perspective view of one of the connecting links.

Figure 1:
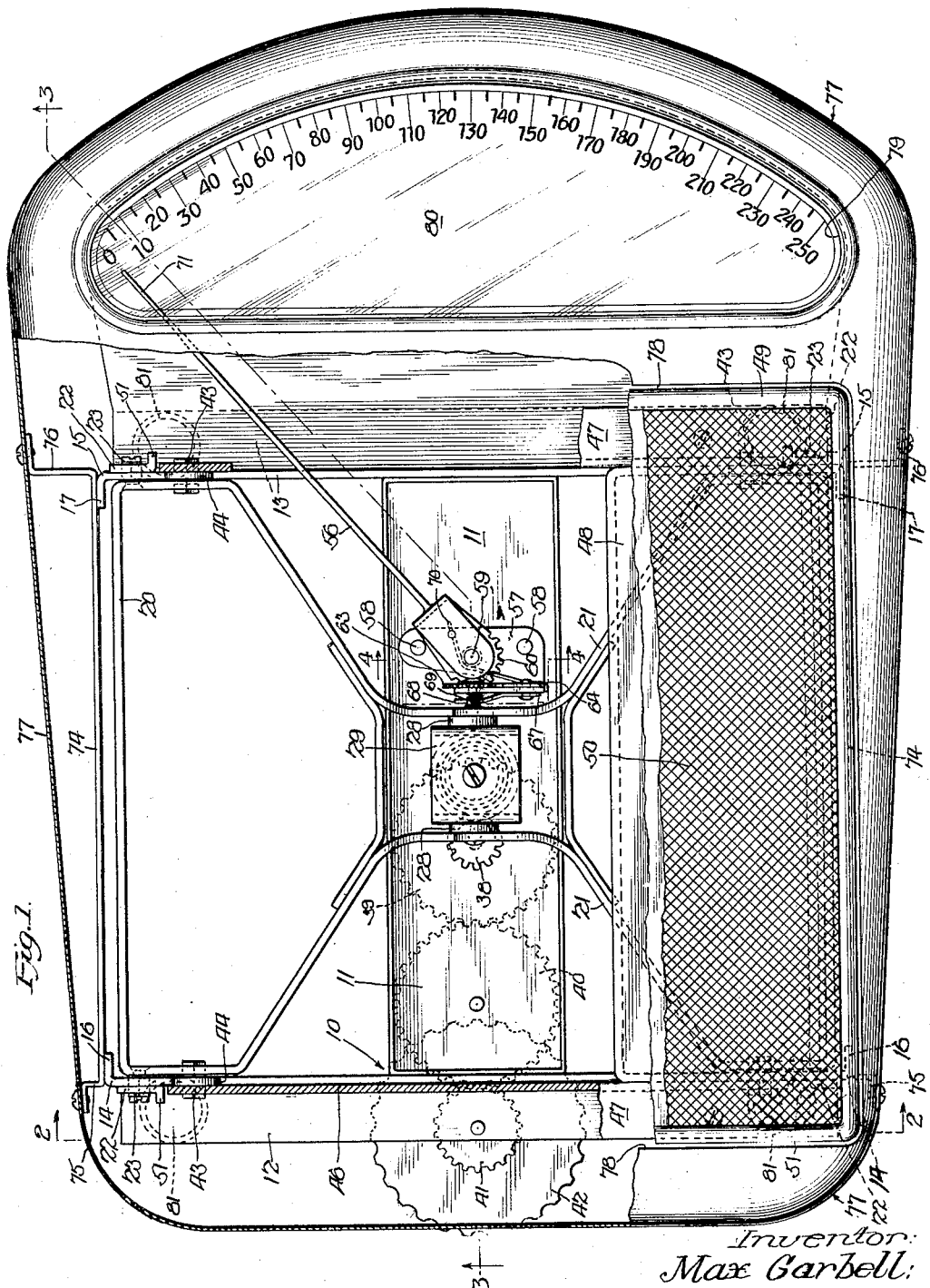
Figure 1 is a top plan view of my improved scale with a portion of the shell and platform broken away to show the interior mechanism.

The reference numeral 10 designates a skeleton frame as a whole which is constructed in the form of an I-beam having a channel-shaped web 11 and angle-shaped flanges 12 and 13 respectively welded or otherwise secured to each end of the web 11. The flanges 12 and 13 are provided with an integral upwardly extending portion 14—14 and 15—15 respectively at each limit end thereof which are formed with an inturned flange 16—16 and 17—17 forming a corner post and providing rigidity to the upwardly extending portions 14—14 and 15—15 of the flanges 12 and 13 respectively. Each of the upwardly extending portions 14—14 and 15—15 are provided with a cut-away portion 18 which forms a substantially wide V-shaped seat or rest 19 that serves as a support for a pair of U-shaped members 20 and 21 respectively which are adapted to be carried for rocking movements between each pair of upwardly extending portions 14—15 at each end of the flanges 12 and 13 of the skeleton frame 10. These seats 19 only serve as temporary supports to facilitate the assembling of the scale as the U-shaped members are positioned thereon as they are permanently retained for rocking movements by means of a guide 22.

The V-shaped members are each provided with a pair of oppositely directed bearings 23 that are preferably of hardened square stock and arranged so as to have one edge engaging the V-shaped seat 19. These members 20 and 21 are positioned on seats 19 with their free ends directed toward each other in superposed relation and are also provided with hardened square studs 24 and 25 respectively which are adapted to extend through the openings 26 and 27 respectively of a link 28 that connects them in pairs for a uniform rocking movement one with the other. These links 28 connect the free ends of the arms of the U-shaped members together and permit of their rocking movement while maintaining them for uniform movement.

The U-shaped members 20 and 21 are relatively wide and are formed to converge so as to provide a relatively narrow space at their free end portions at the point where these links 28 are carried. A saddle 29 is pivotally carried between the free ends of the U-shaped member 21 on the square studs 25 and serves as a means for guiding a compression spring 30 which is interposed between this saddle 29 and an adjustable member 35 carried on the web 11 of the skeleton frame 10. The spring 30 has a block 31 fixed to its upper end portion which is fixed to the saddle 29 and serves to retain the spring in fixed relation with the saddle. The lower end of the spring is also provided with a block 32 that is provided with a conical depression 33 to receive a conical end 34 of an adjustable member 35 which is threaded on an upwardly extending threaded stud 36 that is fixed on the web 11 of the skeleton frame 10. The adjustable member 35 serves to bodily position the spring 30 and has a gear 37 fixed thereto which is in meshing engagement with a pinion gear 38 that is carried on the web 11 and which has a relatively large gear 39 fixed for movement therewith which is in meshing engagement with a similar gear 40 which in turn is in meshing engagement with a pinion gear 41 carried on the flange 12 of the skeleton frame 10. A relatively large thumb-wheel 42 is fixed for movement with a pinion 41 and extends outwardly of the scale and serves as a means for manually adjusting the member 35 on the threaded stud 36 to regulate and adjust the compression spring 30.

The spring 30 is bodily carried with the adjustable member 35 when the same is adjusted vertically on the threaded stud 36 by means of rotating the thumb-wheel 42 and when so adjusted, the spring 30 will cause a swinging movement of the members 20 and 21.

Adjacent the pivotal centers 23 of the U-shaped members 20 and 21 are outwardly directed hardened square studs 43 on each of which a depending link 44 is carried. The free lower end of each of the links 44 is adapted to receive a square stud 45 carried on a depending flange 46 of an angular-shaped member 47 that extends between the pivotal centers 23 of the U-shaped members 20 and 21. These angular-shaped members 47 are connected together by means of channel-shaped members 48 that are preferably welded thereto and serve as a stiffening means for a platform 49 formed of relatively thin sheet material and which has a top pad 50 carried thereon.

As thus far described, it will be noted that the platform comprising the angular members 47 is arranged to be supported on the U-shaped members 20 and 21 by means of the links 44 which gives the platform the effect of being suspended on these U-shaped members and by being supported so close to the pivotal centers 23, a relatively long swinging action of the U-shaped members will be had upon a slight downward movement of the platform. The movement of the U-shaped members 20 and 21 is against the tension of the spring 30 which serves to resist the movement of these members and due to their length require a relatively light spring to take care of weights ranging from zero to approximately 250 pounds.

With this construction it will be noted that a weight may be placed on any part of the platform without affecting a variation in the vertical movement thereof which is transmitted through these U-shaped members for a parallel movement of the platform. In order to guide the platform to prevent a swinging movement thereof on the links 44, I provide an outwardly turned ear 51 on the guide 22 which is positioned in aligned relation and adjacent with the vertical end of the angular member 47 as these guides are positioned and secured to the upwardly extending portions 14 and 15 to securely retain the U-shaped members 20 and 21 on the base 10.

The guides 22 are each provided with an opening 52 that has a relatively wide V-shaped portion 53 which when positioned over the pivotal centers 23 of the U-shaped members 20 and 21 will form a bearing therefor. These guides 22 are hardened while the V-shaped seats 19 serve only as a temporary support while assembling the device and when the guides 22 are secured to the uprights 14 and 15 by means of a screw 54 and a dowel pin 55, their V-shaped portions 53 support the pivotal centers 23 of the members 20 and 21 in slightly raised position with respect to the temporary V-shaped seat 19.

An indicator arm 56 is carried for horizontal swinging movements on an L-shaped bracket 57 which is secured to the web 11 by means of the rivets 58. The bracket 57 supports a vertically extending post 59 on which the indicator arm 56 is pivotally mounted and is provided with gear teeth 60 formed thereon which are in constant meshing engagement with a segmental gear 61 that is pivotally carried for rocking movements on a stud 62 carried in the L-shaped bracket 57. The upper portion of the segmental gear 61 is also provided with gear teeth forming a relatively small segmental gear 63 which is in constant meshing engagement with a rack 64 that is arranged for vertical sliding movements on the L-shaped bracket 57 by means of a pair of guide studs 65—65 that extend through elongated slot openings 66. A slide member 67 is carried on the studs 65—65 for movement with the rack 64 and is provided with an extension 68 which is adapted to be engaged by a stud 69 fixed to one arm of the U-shaped member 21. The extension 68 of the guide 67 is retained in abutting engagement with the stud 69 by means of a spring 70 which is coiled around the post 59 and has one end secured to the indicator arm 56 and with its other end secured to the L-shaped bracket 57. This spring 70 exerts a tension on the indicator in one direction and causes the segmental gear 61 that is in meshing engagement therewith to be urged in one direction and by reason of the rack 64 being in meshing engagement with the segmental teeth 63 on the upper portion of the segmental member, the rack 64 will also be urged upwardly and carry the slide 67 therewith and yieldingly retain the extension 68 thereof in abutting engagement with the stud 69.

As a weight is placed upon the platform 49, a downward rocking action of the U-shaped members 20 and 21 will be had which will cause the stud 69 carried on one of the arms of the member 21 to engage the extension 67 and cause a downward sliding movement of the rack 64 and a rocking movement of the segmental member having the segmental teeth 63 and 61 to cause a horizontal swinging movement of the indicator arm 56 against the tension of the spring 70 and when the weight is removed from the platform, the spring 70 will again restore the indicator and the segmental member and rack to their normal positions. The indicator arm 56 extends outwardly of the base 10 and is flattened at its free end 71 to provide a relatively thin pointer for a dial 72 which is supported on a relatively thin platform 73 that in formed to be carried below the indicator and fixed on the flange 13 of the skeleton frame or base 10.

The upwardly extending portions 14 and 15 of the angular flanges 12 and 13 on the base 10 are reenforced by means of strap members 74 that extend between each pair composed of the portions 14—15 and are welded or otherwise secured thereto with their free ends formed into an angular formation 75 and 76 respectively which are adapted to support a shell-like housing 77. The housing 77 is provided with a relatively large opening 78 on its top surface through which the platform 49 may freely move vertically and is also provided with an opening 79 which has a glass 80 secured to the underside thereof through which the dial 72 and the pointer end 71 of the indicator 56 are visible.

It will be noted that the platform 49 extends an appreciable distance above the top portion of the shell-like housing 77 and permits of any size of load that is within the capacity of the scale to be weighed without affecting its engagement with the shell-like housing 77.

The scale as shown is arranged to be assembled in units and the assembling thereof is facilitated in that the angular members 47 and the channel-shaped members 48 are attached as a unit to the platform 49 and the U-shaped member 20 and 21 are connected thereto by means of the links 44 with the members 20 and 21 connected together by means of the links 28 which have the saddle 29 carried therebetween. The base 10 is also assembled as a unit and has the adjustable stud 35 and the train of gears forming the manually adjustable means. The indicator bracket 57 is then secured to the base 10 as an assembly, having the indicator 56, the rack 64 and the segment 61—63 and the guide 67. The platform assembly is then positioned with the pivotal centers 23 of the arms 20 and 21 on the seats 19, then the compression spring 30 is positioned so as to be interposed between the saddle 29 and the threaded adjustable stud 35 and the stud 69 on the member 21 will then engage the top surface of the extension 68 of the guide 67 for actuating the indicator 56. The guides 22 are then placed into position with their openings 52 over the pivotal centers 23 of the members 20 and 21 and are secured by means of the screws 54 to the upwardly extending portions 14 and 15 of the base 10 and serves to retain the platform and base together as an assembly. The shell-like housing 77 is then placed into position and is secured to the angular formations 75 and 76 of the strap members 74.

A set of feet 81 are secured adjacent each extreme end of the flanges 12 and 13 on the base 10 and support the scale in slightly raised position from the floor line.

This invention resides in the construction and novel arrangement of parts and means of assembling the same to form an efficient and sturdy construction that will withstand the jerks, jolts and abuses which are common to this type of scale without materially affecting the working parts.

I claim:

1. In a device of the character described, the combination of a reinforced frame, a pair of yoke-shaped members pivotally carried on the frame and having their free ends directed toward each other, links connecting the free ends of the yoke-shaped members for movement one with the other, a saddle pivotally mounted and bodily carried for movement with the yoke-shaped members, a spring interposed between the saddle and the frame, a platform pivotally carried on the yoke-shaped members, a registering mechanism including a dial, and connections operatively connecting the yoke-shaped arms to actuate the registering mechanism on the movement of the platform.

2. In a device of the character described, the combination of a reinforced skeleton frame forming a base, a pair of yoke-shaped members pivotally carried on the skeleton frame and having their free ends directed toward each other, links connecting the free ends of the yoke-shaped members for movement with each other, a saddle pivotally carried and bodily movable with the yoke-shaped members, a spring interposed between the saddle and the skeleton frame, a platform pivotally carried on each of the yoke-shaped members, a registering mechanism including a dial, a housing enclosing the skeleton frame and having openings therein through one of which the platform may freely pass and the other of said openings to provide visibility to the dial, and connections between the yoke members and the registering mechanism operatively connecting said registering mechanism for movement with the platform.

3. In a device of the character described, the combination of a skeleton frame of relatively thin material reenforced to form a rigid base, a pair of yoke members formed to provide a relatively wide body portion adapted to be carried for rocking movements on the base, said yoke members having their free ends directed toward each other and arranged in superposed relation, link means connecting the free ends of the yoke members, a saddle pivotally carried for movement with the yoke members, a spring interposed between the saddle and the skeleton frame, a platform carried on the yoke members, registering mechanism including a dial, a rack and pinion drive operatively connecting the saddle with the registering mechanism, and a shell-like housing having openings therein through one of which openings the platform may freely pass and through the other of which openings the registering mechanism and dial are visible.

4. In a device of the character described, the combination of an I-shaped skeleton frame of relatively thin material and reenforced to form a rigid base, said base being provided with upwardly extending portions, a pair of U-shaped members formed of sheet material and with their free ends formed to converge and disposed in superposed relation with each other and with their body portions pivotally carried for rocking movements on the upwardly extending portions of the base, links connecting the free ends of the U-shaped members, a saddle pivotally carried between the links, a spring interposed between the saddle and the skeleton frame, a platform pivotally carried on the U-shaped members, registering mechanism including a dial, a rack and pinion drive operatively connecting the U-shaped members with the registering mechanism, and a shell-like housing having openings therein through one of which openings the platform may freely move and the other of said openings providing visibility to the registering mechanism and dial.

5. In a device of the character described, the combination of a reenforced I-shaped skeleton frame having an upwardly extending leg on each corner thereof, a pair of U-shaped members pivotally carried on the legs of the skeleton frame and having their free ends directed toward each other in superposed relation, links connecting the free ends of the U-shaped members for movement one with the other, a saddle pivotally mounted and bodily carried for movement with the U-shaped members, an adjustable member carried in the web of the skeleton frame, a spring interposed between the saddle and the adjustable member on the skeleton frame, a platform pivotally carried on the U-shaped members, a registering mechanism including a dial, connections operatively connecting the U-shaped members to actuate the registering mechanism on the movement of the platform, and manually manipulative means connecting the adjustable member to regulate the positioning of the U-shaped members to in turn adjust the registering mechanism to the zero position of the dial.

6. In a device of the character described, the combination of a reenforced I-shaped skeleton frame forming a base having upwardly directed legs arranged in pairs, a pair of U-shaped members pivotally carried on the legs of the skeleton frame and having their free ends directed toward each other and arranged in superposed relation, vertically disposed links connecting the free ends of the U-shaped members for movement with each other, a saddle pivotally carried and bodily movable with the U-shaped members, an adjustable member carried on the skeleton frame, a spring interposed between the saddle and the adjustable member, a platform pivotally carried on each of the U-shaped members, a registering mechanism including a dial, a housing enclosing the skeleton frame and having openings therein through one of which openings the platform may freely pass and the other of said openings to provide visibility to the dial, and connections between the U-shaped members and the registering mechanism operatively connecting said registering mechanism for movement with the platform.

7. In a device of the character described, the combination of a reenforced skeleton frame, a pair of members pivotally carried at one end thereof on the skeleton frame and having their free ends in superposed relation, link means connecting the free ends of the pair of members, a saddle carried for movement with said members, an adjustable member carried on the base, a compression spring interposed between the saddle and the adjustable member, a platform, depending links connecting the platform with said members, a registering mechanism including a dial, and connections operatively connecting the members to actuate the registering mechanism on the movement of the platform.

8. In a device of the character described, the combination of a reenforced skeleton frame forming a base, a pair of members pivotally carried on the skeleton frame and having their free ends directed toward each other in superposed relation, link means connecting the free ends of the members for movement with each other, a saddle pivotally carried and bodily movable with the members, an adjustable member carried on the base, a spring interposed between the saddle and the adjustable member, a platform, depending links connecting the platform with the pair of members, a registering mechanism including a dial, a housing enclosing the skeleton frame and having openings therein through one of which openings the platform may freely pass and the other of said openings to provide visibility to the dial, connections between said members and the registering mechanism operatively connecting said registering mechanism for movement with the platform, and manually manipulative means associated with the adjustable member for adjusting the same to regulate the positioning of the spring and said pair of members for adjusting the registering mechanism.

9. In a device of the character described, the combination of a reenforced base, a pair of members pivotally connected together at one end and carried on the base, link means connecting the ends of the pair of members together, a saddle carried for movement with said members, an adjustable member carried on the base, a compression spring interposed between the saddle and the adjustable member, a platform, depending links connecting the platform with said members, a registering mechanism including a dial, connections operatively connecting the members to actuate the registering mechanism on the movement of the platform, and guide means coacting with the platform for guiding its vertical movements.

MAX GARBELL.